US007784401B2

(12) United States Patent
Ozawa et al.

(10) Patent No.: US 7,784,401 B2
(45) Date of Patent: Aug. 31, 2010

(54) REACTION FIELD INDEPENDENT JIG AND REACTION CHIP PROCESSING APPARATUS USING THE JIG

(75) Inventors: Tomoyuki Ozawa, Tokyo (JP); Hiroyuki Kuroki, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 12/707,066

(22) Filed: Feb. 17, 2010

(65) Prior Publication Data

US 2010/0139507 A1 Jun. 10, 2010

Related U.S. Application Data

(63) Continuation of application No. PCT/JP2008/063830, filed on Aug. 1, 2008.

(30) Foreign Application Priority Data

Aug. 17, 2007 (JP) ............................ 2007-212663

(51) Int. Cl.
*B30B 15/34* (2006.01)
*G01N 35/08* (2006.01)

(52) U.S. Cl. .......................... 100/315; 436/55; 204/164

(58) Field of Classification Search ................. 100/321, 100/322, 323, 102, 315; 204/164, 298.38, 204/547, 643; 436/52, 53, 55

See application file for complete search history.

(56) References Cited

U.S. PATENT DOCUMENTS

| | | | | |
|---|---|---|---|---|
| 5,708,293 | A * | 1/1998 | Ochi et al. | 257/666 |
| 5,997,378 | A * | 12/1999 | Dynka et al. | 445/25 |
| 6,306,756 | B1 * | 10/2001 | Hasunuma et al. | 438/632 |
| 2008/0153169 | A1 * | 6/2008 | Hirata et al. | 436/55 |
| 2008/0169184 | A1 * | 7/2008 | Brown et al. | 204/164 |

FOREIGN PATENT DOCUMENTS

| | | |
|---|---|---|
| JP | 2004-353704 | 12/2004 |
| JP | 2005-037368 | 2/2005 |
| JP | 2006-026452 | 2/2006 |
| WO | 02/01181 A2 | 1/2002 |

* cited by examiner

*Primary Examiner*—Jimmy T Nguyen
(74) *Attorney, Agent, or Firm*—Squire, Sanders & Dempsey, L.L.P.

(57) ABSTRACT

The invention provides, with a simple technique, a jig for reliably stemming one or a plurality of flow paths and/or a portion of reaction fields continuously provided in a reaction chip, and for making the flow paths and/or reaction fields independent, and a reaction ship processing apparatus.

A reaction field independent jig for making a plurality of reaction fields of a reaction chip independent, the reaction chip including a substrate and a lid material, the substrate including at least the reaction fields and a flow path that brings the reaction fields into communication with each other, the lid material being disposed on the substrate on a side where the reaction fields and the flow path are provided, wherein the reaction field independent jig includes one or a plurality of reaction field independent blades that carry out a squashing operation for squashing the flow path from above the substrate and/or from above the lid material, and the reaction field independent blade includes a heater unit that carries out a heating operation.

7 Claims, 3 Drawing Sheets

REACTION FIELD INDEPENDENT JIG AND REACTION CHIP PROCESSING APPARATUS USING THE JIG

TECHNICAL FIELD

The present invention relates to a reaction field independent jig (jig for separating into a plurality of reaction fields) of a reaction chip that is applied when inspecting DNA or SNP, and to a reaction chip processing apparatus using the jig.

BACKGROUND ART

Conventionally, as a reaction apparatus for processing a very small amount of sample solution in a biochemical reaction and the like, there exists a plan for analyzing a plurality of analytes or carrying out a plurality of reactions by providing one chip or cartridge called μ-TAS (Total Analysis System) or lab-on-chip with a plurality of reaction fields or flow paths. Such techniques can reduce the amount of reagents to be used by reducing the chip and the cartridge in size, and since the amount of reagents to be used can be reduced, there are many advantages.

Examples of the advantages are that effect on human body or environment is remarkably reduced by largely reducing the amount of strong acid or alkaline agents that are conventionally used, and costs required for carrying out a reaction are reduced by largely reducing the consumption amount of expensive reagent that is used for biochemical reaction or the like.

In order to most efficiently carry out the biochemical reaction using chips or cartridges, it is necessary to dispose a plurality of different agents, analytes and enzymes in a plurality of reaction fields, to collectively flow a reagent that reacts with the agents, analytes and enzymes from one or several main conduits, and to generate a plurality of different reactions. According to this technique, it is possible to simultaneously process a plurality of analytes with the same reagent, or to subject one kind of analyte to a plurality of processing operations in a biochemical reaction.

In order to carry out a reaction of a reagent using a plurality of flow paths or a plurality of reaction fields, a stemming mechanism for fluid is absolutely necessary for preventing different reagents or analytes from being mixed between the flow paths or reaction fields.

Various ideas have been devised to solve such a problem, and there exist the following techniques, for example.

According to Patent Document 1, to prevent liquids or substances from being mixed between a plurality of containers, the following cartridge is invented, that is, a plurality of reaction fields and flow paths are formed in a substrate made of rigid body and a container made of elastic body, and an external force is applied to the elastic body from outside the container, thereby partially blocking the flow path to allow movement of the fluid material or to stop the fluid material.

Patent Document 2 describes a self-holding micro-flow path valve in which a valve body capable of holding a flow path in its closed state or opened state is provided with a solenoid that can reciprocate in the flow path, and the flow path can open or close with very small electricity.

However, if the elastic body is pushed against the rigid body using the external force as in Patent Document 1, reliability of blocking the flow path is low, and a very small complicated valve as described in Patent Document 2 is expensive in cost and mass production properties thereof are low.

Patent Document 1: Japanese Patent Application Laid-open No. 2005-37368

Patent Document 2: Japanese Patent Application Laid-open No. 2004-353704

SUMMARY OF THE INVENTION

The present invention has been accomplished in view of the above circumstances, and provides, with a simple technique, a jig for reliably stemming one or a plurality of flow paths and/or a portion of reaction fields continuously provided in a reaction chip, and for making the flow paths and/or reaction fields independent of each other.

Means for Solving the Problem

According to a first aspect of the present invention, there is provided a reaction field independent jig for making a plurality of reaction fields of a reaction chip independent, the reaction chip including a substrate and a lid material, the substrate including at least the reaction fields and a flow path that brings the reaction fields into communication with each other, the lid material being disposed on the substrate on a side where the reaction fields and the flow path are provided, wherein the reaction field independent jig includes one or a plurality of reaction field independent blades (blades for separating into plurality of reaction fields) that carry out a squashing operation for squashing the flow path from above the substrate and/or from above the lid material, and the reaction field independent blade includes a heater unit that carries out a heating operation.

According to a second aspect of the present invention, in the reaction field independent jig according to claim 1, a flow path contact portion of the reaction field independent blade is of prismoidal or truncated cone shape.

According to a third aspect of the present invention, in the reaction field independent jig according to the second aspect of the present invention, an angle portion of an upper surface of the prismoidal or truncated cone shape has roundness of R0.2 mm or greater.

According to a fourth aspect of the present invention, in the reaction field independent jig according to the first aspect of the present invention, the flow path contact portion of the reaction field independent blade is of shape having roundness of R0.2 mm or greater.

According to a fifth aspect of the present invention, in the reaction field independent jig according to the first aspect of the present invention, the reaction field independent blade is made of material selected from metal, ceramic and glass.

According to a sixth aspect of the present invention, in the reaction field independent jig according to the first aspect of the present invention, the heater unit is selected from a ceramic heater, a heating wire and a Peltier device.

An invention of a seventh aspect of the present invention provides a reaction chip processing apparatus including the reaction field independent jig according to the first aspect of the present invention.

Effect of the Invention

According to the first aspect of the present invention, there is provided a reaction field independent jig for making a plurality of reaction fields of a reaction chip independent, the reaction chip including a substrate and a lid material, the substrate including at least the reaction fields and a flow path that brings the reaction fields into communication with each other, the lid material being disposed on the substrate on a side where the reaction fields and the flow path are provided, wherein the reaction field independent jig includes one or a plurality of reaction field independent blades that carry out a squashing operation for squashing the flow path from above the substrate and/or from above the lid material, and the reaction field independent blade includes a heater unit that carries out a heating operation.

By squashing and plastically deforming the flow path from outside using the reaction field independent blade, it is possible to stem the flow path and to make the reaction fields independent. Since the jig includes the heater unit, it is possible to heat at the same time as squashing the flow path, and to locally heat the squashing location. It is thus possible to prevent a reagent or an enzyme in the reaction chip from being deteriorated.

According to the second aspect of the present invention, in the reaction field independent jig according to the first aspect of the present invention, a flow path contact portion of the reaction field independent blade is of prismoidal or truncated cone shape.

By forming the flow path contact portion into the prismoidal or truncated cone shape, the tip end of the blade portion can be thinned, and a pressure applied to the blade tip end can be increased with respect to a force of the pushing mechanism of the squashing jig.

According to the third aspect of the present invention, in the reaction field independent jig according to the second aspect of the present invention, an angle portion of an upper surface of the prismoidal or truncated cone shape has roundness of R0.2 mm or greater.

Since the angle portion of the upper surface of the prismoidal or truncated cone shape has roundness of R0.2 mm or greater, it is possible to prevent the reaction chip from being damaged by the prismoidal or truncated cone shaped angle portion at the time of the squashing operation.

According to the fourth aspect of the present invention, in the reaction field independent jig according to the first aspect of the present invention, the flow path contact portion of the reaction field independent blade is of shape having roundness of R0.2 mm or greater.

Since the flow path contact portion of the blade portion is of shape having roundness of R0.2 mm or greater, it is possible to prevent the reaction chip from being damaged by the flow path contact portion of the reaction field independent blade at the time of the squashing operation.

According to the fifth aspect of the present invention, in the reaction field independent jig according to the first aspect of the present invention, the reaction field independent blade is made of material selected from metal, ceramic and glass.

Since the reaction field independent blade is made of material selected from metal, ceramic and glass, if metal is selected for example, heating time can be shortened, and a highly precise shape can be formed by cutting work. In the case of ceramic or glass, once it is heated, uneven temperature caused by heat radiation can be reduced. The metal, glass and ceramic have such characteristics that heatproof temperature is high in general, and a degree of softening or deterioration caused by heating is low.

According to the sixth aspect of the present invention, in the reaction field independent jig according to the first aspect of the present invention, the heater unit is selected from a ceramic heater, a heating wire and a Peltier device.

The ceramic heater, the heating wire or the Peltier device is used as the heater unit. If the ceramic heater or the heating wire is used, the heating time is short, and there are many kinds of ceramic heaters and heating wires as commercial items. Therefore, performance can be selected in accordance with setting conditions. In the case of the Peltier device, it is easy to control the temperature, and accident and risk such as thermal runaway can be reduced. The ceramic heater, the heating wire and the Peltier device in general can relatively inexpensively control the temperature, and have such characteristics that they are small in size and can easily be incorporated in the apparatus or the jig.

The invention of the seventh aspect of the present invention provides a reaction chip processing apparatus including the reaction field independent jig according to the first aspect of the present invention.

Since the reaction field independent jig is small in size, the jig can be incorporated in the reaction chip processing apparatus that makes a sample react and/or optically measures the reacted sample.

EXPLANATION OF REFERENCE NUMERALS

Figure 1:
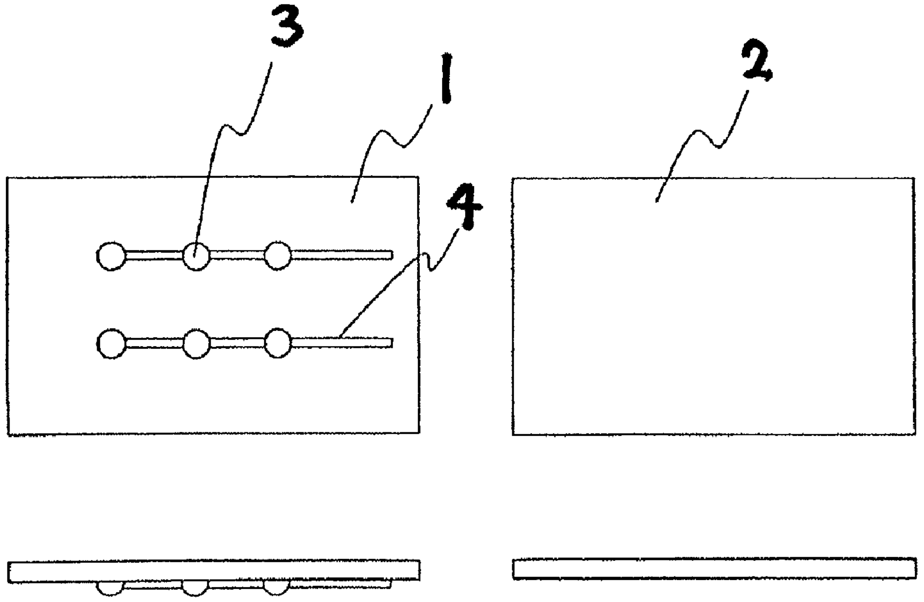
FIG. 1 is a schematic diagram showing one example of a reaction chip.

1 substrate
2 lid material
3 reaction field
4 flow path
5 chip receiver
6 reaction field independent blade
7 heater unit
8 handle
9 spring
10 press plate
11 heater
12 flow path contact portion

Best Mode For Carrying Out The Invention

The best mode for carrying out the invention will be described with reference to the accompanying drawings.

FIG. 1 is an exemplary schematic diagram of a reaction chip schematically showing a substrate 1 including at least a plurality of reaction fields 3 and flow paths 4 that bring the plurality of reaction fields 3 into communication with each other, and a lid material 2 disposed on the substrate 1 on a side where the reaction fields 3 and the flow paths 4 are provided.

Figure 2:
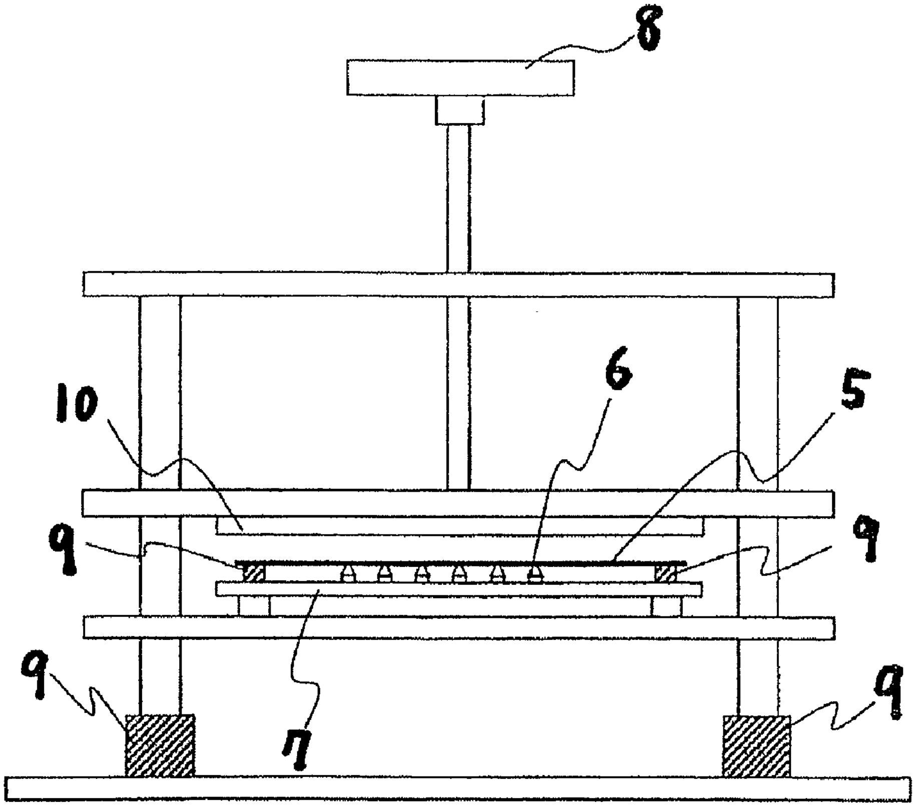
FIG. 2 is a schematic diagram showing one example of a reaction field independent jig of the invention.
Figure 3:
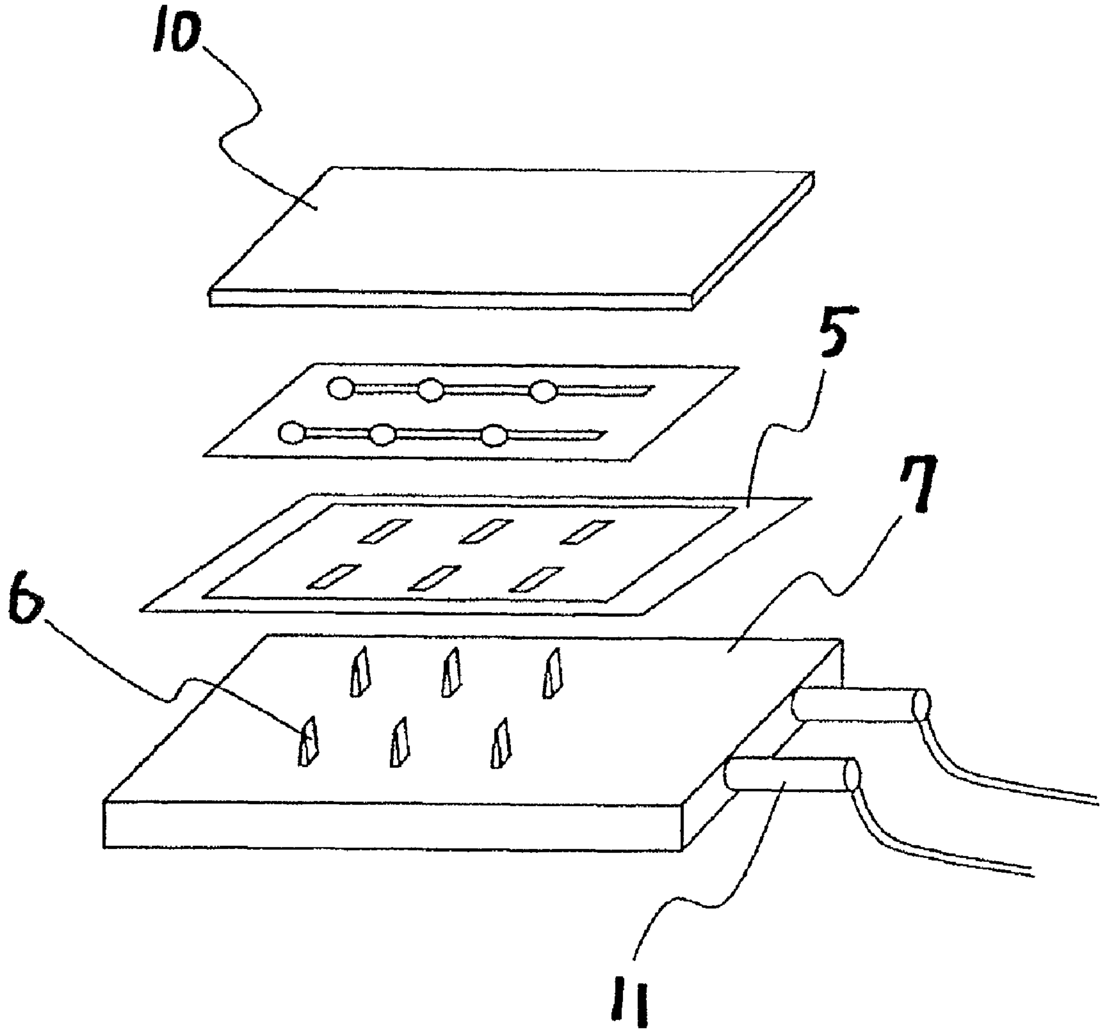
FIG. 3 is a schematic diagram showing one example of a chip receiver and reaction field independent blades.

FIG. 2 shows one example of a reaction field independent jig that squashes the flow path of the reaction chip from above the substrate and/or from above the lid material, and that makes the reaction fields independent of each other. FIG. 3 is a partially enlarged diagram of the reaction field independent jig. The reaction field independent jig includes one or a plurality of reaction field independent blades 6 that carry out the squashing operation, and the reaction field independent blade 6 includes a heater unit 7 that carries out a heating operation. The number of reaction field independent blades 6 or distances between the reaction field independent blades 6 are appropriately selected in accordance with a reaction chip to be used.

Figure 4:
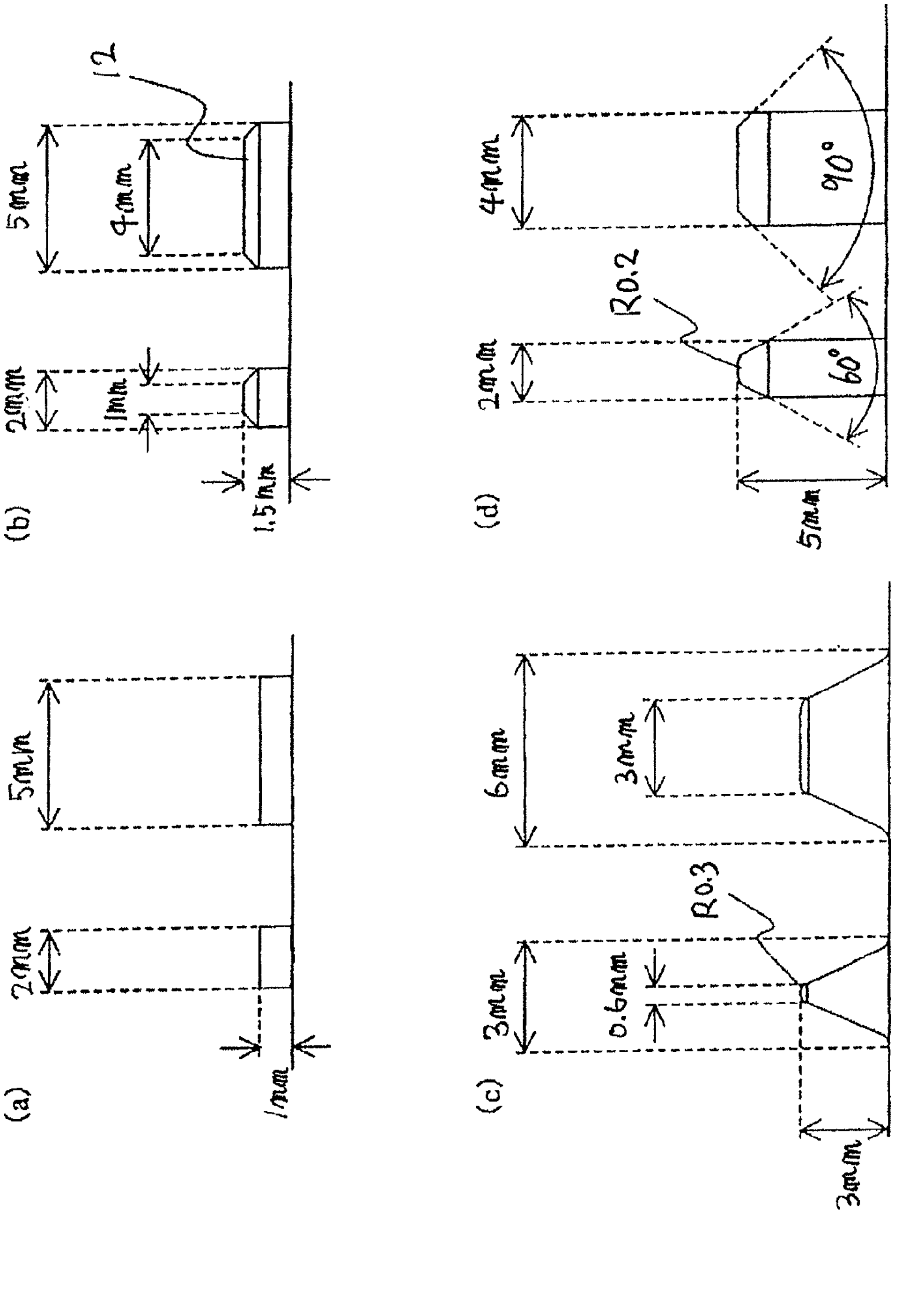
FIGS. 4(*a*) to 4(*d*) are schematic diagrams showing examples of the reaction field independent blade.

Next, a shape of the reaction field independent blade will be described using FIG. 4. FIG. 4 are front views and side views of one example of the reaction field independent blade. In the drawings, a unit of numeric values is mm.

A reaction field independent blade shown in FIG. 4(*a*) is a rectangular parallelepiped metal block of 2 mm (short side)×5 mm (long side)×1 mm (height).

A reaction field independent blade shown in FIG. 4(*b*) is provided at its tip end with a flow path contact portion 12 having a prismoidal or truncated cone shape. By forming the flow path contact portion 12 into the prismoidal or truncated cone shape, the tip end of the reaction field independent blade can be thinned, and a pressure of a blade tip end can be increased with respect to a pushing force of a blade portion, and a load applied to a squashing portion can be increased.

If an angle portion of an upper surface of the prismoidal or truncated cone shape is provided with roundness of R0.2 mm or more, it is possible to prevent the reaction chip from being damaged by an angle portion of the prismoidal or truncated cone shape at the time of the squashing operation, and this configuration is more preferable.

In a reaction field independent blade shown in FIG. 4(*c*), a cross section of a tip end of a flow path contact portion has a spherical shape. By forming the tip end of the flow path contact portion into the spherical shape having roundness of R0.2 mm or more, a load can be made greater than that of the flow path contact portion of the above-described prismoidal or truncated cone shape. Further, since the tip end is of the spherical shape, it is possible to prevent a reaction chip from being damaged at the time of the squashing operation.

A height of a reaction field independent blade shown in FIG. 4(*d*) is 5 mm, which is higher than those shown in FIGS. 4(*a*) to 4(*c*). With this configuration, the flow path contact portion can be located away from the heater unit, and it is possible to prevent the flow path contact portion from being deteriorated by heat of a reagent or an enzyme in the reaction chip.

The reaction field independent blade is made of material selected from metal, ceramic and glass. Since the reaction field independent blade is made of material selected from metal, ceramic and glass, several different effects can be expected, the material can be changed in accordance with required conditions and performance of the apparatus can be enhanced. If metal is selected for example, heating time can be shortened and a highly precise shape can be formed by cutting work, which is effective when a stemming portion for making the reaction fields independent has a complicated shape or when a space for pushing the reaction field independent blade is small. In the case of ceramic or glass, once it is heated, uneven temperature caused by heat radiation can be reduced and thus, it is possible to increase or decrease the temperature in accordance with material of a sealant layer or a molten layer of the reaction chip. The metal, glass and ceramic have such characteristics that heatproof temperature is high in general, and a degree of softening or deterioration caused by heating is low.

Next, the heater unit will be described. A ceramic heater, a heating wire or a Peltier device is used as the heater unit. The ceramic heater, the heating wire or the Peltier device is used as the heater unit, several different effects can be expected. For example, if the ceramic heater or the heating wire is used, since the heating time is short and the heatable temperature is high, no problem is caused even if the temperature of the sealant layer or the molten layer of the reaction chip becomes several hundred degrees, and the blade tip end can be heated to a predetermined temperature in a short time. Since there are many kinds of ceramic heaters and heating wires as commercial items, performance can be selected in accordance with setting conditions, it is possible to design in accordance with material used for the reaction chip when the apparatus is designed, and it is possible to relatively easily accept specification change at a later stage. In the case of the Peltier device, it is easy to control the temperature, and accident and risk such as thermal runaway can be reduced. The ceramic heater, the heating wire and the Peltier device in general can relatively inexpensively control the temperature, and have such characteristics that they are small in size and can easily be incorporated in the apparatus or the jig.

Next, a method of using the reaction field independent apparatus of the invention will be described.

It is preferable that a material forming the flow path of the reaction chip used in this apparatus be a plastically deformable material, which does not easily become cracked or damaged when plastically deformed. If the flow path of the reaction chip is provided with an adhesion layer or a cohesion layer, a plastically deformed portion is sealed, and a reaction field or a flow path can become independent more completely.

A series of flows of the reaction field independence according to the invention in a reaction chip that is suitable for the biochemical reaction will be described.

First, a reaction chip is prepared. At this time, a substance that causes a reaction with respect to a sent-liquid is already fixed to the reaction field in the reaction chip, and a lid material is adhered to the reaction chip to hermetically close the reaction chip. At this time, it is preferable that a capacity of the reaction field be in the range of several μl to several tens of μl. The reaction may be either a chemical reaction or a biochemical reaction. A drying and solidifying method, a fixing method by surface treatment, and an adhering method together with water-soluble microcapsule can freely be used as a method of fixing a reaction material.

Next, the reaction chip is set on a chip receiver 5 located immediately above the reaction field independent blade 6. The chip receiver 5 holds the reaction chip, and determines a position where the reaction field independent blade 6 abuts. Holes are formed in the chip receiver 5 at reaction field independence positions such that the blades smoothly abut the chip. A size of each hole is about 3 mm×5 mm in accordance with the shape of a blade, the number of holes can be the same as the number of stemming locations, and the entire reaction portion may be hollowed out.

A heater 11 that is incorporated in the heater 7 carries out the heating operation, and the entire reaction field independent blades including the blade tip ends are heated. When a general sealant layer is used, it is conceived that the heating temperature is about 130° C. to 250° C. It is more preferable that the temperature of the blade tip end be observed by a thermocouple or a platinum resistor and managed using a temperature adjusting device.

When the temperature of the blade tip end reaches a predetermined value and is stabilized, a handle 8 is rotated, the chip placed on the chip receiver is pressed while sandwiching the chip between a press plate 10 and the reaction field independent blade 6, and the blade tip end deforms the flow path that connects the reaction fields on the chip with each other.

If the pushing pressure is insufficient, it is preferable that a ball screw be rotated using a motor and a gear unit, and the reaction chip is pushed with a strong pressure.

At this time, a resin layer or an adhesion layer in the chip is melted by heat to fill a gap of the deformed flow path.

The reaction field independent blade 6 is returned to its original position by a force of a spring 9 immediately after the resin layer or the adhesion layer of the blade tip end contact portion is melted so that the liquid in the chip is not boiled or a reagent is not damaged. With the blade tip end disengaged from the chip, overheating of the reaction chip can be prevented.

When the resin layer or the adhesion layer in the melted and deformed flow path is cooled and solidified in the reaction chip, the operation for making the reaction fields independent is completed.

As described above, if the jig of the present invention is used, it is possible to provide, with a simple technique, a jig for reliably and partially stemming one or a plurality of flow paths and/or a portion of reaction fields provided in a reaction chip, and for making the flow paths and/or reaction fields independent.

Although the reaction field independent jig (apparatus) is independent of the reaction chip processing apparatus in the best mode for carrying out the invention, the reaction field independent jig may be incorporated in the reaction chip processing apparatus that makes a sample react and/or optically measures the reacted sample.

The invention claimed is:

1. A reaction field independent jig for making a plurality of reaction fields of a reaction chip independent, the reaction chip including a substrate and a lid material, the substrate including at least the reaction fields and a flow path that brings the reaction fields into communication with each other, the lid material being disposed on the substrate on a side where the reaction fields and the flow path are provided, wherein the reaction field independent jig comprises one or a plurality of reaction field independent blades that carry out a squashing operation for squashing the flow path from above either one or both of the substrate and the lid material, and each of the reaction field independent blades includes a heater unit that carries out a heating operation.

2. The reaction field independent jig according to claim 1, wherein a flow path contact portion of each of the reaction field independent blades is of a prismoidal or truncated cone shape.

3. The reaction field independent jig according to claim 2, wherein an angle portion of an upper surface of the prismoidal or truncated cone shape has a roundness of R0.2 mm or greater.

4. The reaction field independent jig according to claim 1, wherein a flow path contact portion of each of the reaction field independent blades is of shape having roundness of R0.2 mm or greater.

5. The reaction field independent jig according to claim 1, wherein each of the reaction field independent blades is made of a material selected from the group consisting of metal, ceramic and glass.

6. The reaction field independent jig according to claim 1, wherein the heater unit is a device selected from the group consisting of a ceramic heater, a heating wire and a Peltier device.

7. A reaction chip processing apparatus comprising a reaction field independent jig for making a plurality of reaction fields of a reaction chip independent, the reaction chip including a substrate and a lid material, the substrate including at least the reaction fields and a flow path that brings the reaction fields into communication with each other, the lid material being disposed on the substrate on a side where the reaction fields and the flow path are provided, wherein the reaction field independent jig comprises one or a plurality of reaction field independent blades that carry out a squashing operation for squashing the flow path from above either one or both of the substrate and the lid material, and each of the reaction field independent blades includes a heater unit that carries out a heating operation.

* * * * *